(12) United States Patent
Jaw

(10) Patent No.: US 6,490,543 B1
(45) Date of Patent: Dec. 3, 2002

(54) LIFEOMETER FOR MEASURING AND DISPLAYING LIFE SYSTEMS/PARTS

(75) Inventor: Link C. Jaw, Scottsdale, AZ (US)

(73) Assignee: Scientific Monitoring Inc, Tempe, AZ (US)

( * ) Notice: Subject to any disclaimer, the term of this patent is extended or adjusted under 35 U.S.C. 154(b) by 0 days.

(21) Appl. No.: 09/352,804

(22) Filed: Jul. 13, 1999

(51) Int. Cl.$^7$ ................................................. G06F 11/30
(52) U.S. Cl. ........................ 702/184; 340/457.4; 701/30
(58) Field of Search .............................. 702/34, 50, 61, 702/63, 79, 84, 127, 176–184, 186, 187; 73/117.3; 320/132; 340/457.4, 636; 701/30

(56) References Cited

U.S. PATENT DOCUMENTS

| | | | | |
|---|---|---|---|---|
| 2,669,871 A | * | 2/1954 | Lubinski ....................... | 173/20 |
| 3,517,177 A | * | 6/1970 | Crowell ........................ | 702/34 |
| 3,950,985 A | * | 4/1976 | Buchwald et al. ............ | 702/34 |
| 4,112,747 A | * | 9/1978 | Aldridge et al. .............. | 73/116 |
| 4,176,396 A | * | 11/1979 | Howatt ........................ | 700/175 |
| 4,280,185 A | * | 7/1981 | Martin ......................... | 701/99 |
| 4,333,149 A | * | 6/1982 | Taylor et al. ................ | 320/149 |
| 4,351,029 A | * | 9/1982 | Maxey et al. ................. | 340/680 |
| 4,707,796 A | * | 11/1987 | Calabro et al. ............... | 702/34 |
| 4,733,361 A | * | 3/1988 | Krieser et al. ............... | 340/945 |
| 4,733,974 A | * | 3/1988 | Hagerman ................... | 374/103 |
| 4,888,716 A | * | 12/1989 | Ueno .......................... | 324/429 |
| 5,027,268 A | * | 6/1991 | Sakurai et al. ................ | 700/79 |
| 5,042,295 A | * | 8/1991 | Seeley ........................ | 701/100 |
| 5,691,621 A | * | 11/1997 | Phuoc et al. ................. | 320/134 |
| 5,750,887 A | * | 5/1998 | Schricker .................... | 340/438 |
| 5,777,211 A | * | 7/1998 | Binienda et al. ............. | 73/118.1 |
| 5,825,156 A | * | 10/1998 | Patillon et al. .............. | 320/134 |
| 5,877,692 A | * | 3/1999 | Watanabe et al. ........ | 340/457.4 |
| 5,942,981 A | * | 8/1999 | Kackman .................... | 340/636 |
| 6,023,150 A | * | 2/2000 | Patino et al. ................ | 320/132 |
| 6,148,273 A | * | 11/2000 | Maeda ........................ | 324/769 |

* cited by examiner

Primary Examiner—Marc S. Hoff
Assistant Examiner—Manuel L. Barbee
(74) Attorney, Agent, or Firm—The Halvorson Law Firm

(57) ABSTRACT

Lifeometer and general operation algorithm of lifeometer. Optimal base reference life expectancy for the system/part being measured is provided. Lifeometer calculates and displays the rate of usage, the life used, or the life remaining. The information displayed is used by operators or users of the part or machine to make maintenance or service decisions. Lifeometer monitors and tracks/records internal operational parameters, environmental or external operational parameters or outside conditions at or near the system/part, and/or operating history of the system/part. If the system/part is at a life level to be serviced or replaced, then the system/part is serviced or replaced, and the lifeometer resets remaining life level and/or used life level to appropriate values. Lifeometer has a system/part monitor, a digital processor with virtual memory, a database in storage, a display system, and an environmental/outside conditions monitor. Lifeometer uses the internal operational parameters, the external operational parameters, and/or the operating history information for determining present rate of usage for a system/part. Lifeometer uses the rate of usage and amount of time operated to calculate present usage, and the lifeometer uses the present usage, the operating history, and the life expectancy information to determine and calculate used life and/or life remaining. Used life and/or life remaining is displayed on a display system (i.e. display 88, 100, or 108). Mathematical formula and equations for weighting and factoring in the internal operating parameters, the external operating parameters, and the operating history for determining rate of usage of the system/part are used with the present invention.

6 Claims, 6 Drawing Sheets

Figure 6

116 — $RU = (W_{IP} * W_{EP} * W_{HO}) * NRU$

118 — Example $W_{IP}$ = weighed factor for internal parameters
= $W_{Temp} * W_L * W_S * W_D$ 120 — Example $W_{EP}$ = weighed factor for external parameters
= $W_{Wind} * W_{Ext.\ Temp} * W_{Particulates} * W_{Pressure} * W_{Moisture}$ 121 — Example $W_{OH}$ = weighed factor for operating history

LIFEOMETER FOR MEASURING AND DISPLAYING LIFE SYSTEMS/PARTS

FIELD OF INVENTION

The present invention relates to a device and method for measuring life of systems/parts, and, in particular, to a lifeometer that accounts for internal and/or external parameters and/or operating history and respectively determines and measures life usage and remaining life of systems/parts.

BACKGROUND OF INVENTION AND BRIEF DESCRIPTION OF THE PRIOR ART

Many devices have various systems, components, and/or parts that operate over estimated life expectancies. These systems or parts are frequently related to thermodynamic systems, fluid mechanic systems, thermo-mechanical systems, or any other system/part with fluctuating or varying mechanical or external parameters. One common example are the various components, or parts, of an engine or a power plant. Many of these parts experience varying parameters, such as pressures and/or temperatures. The variations in these parameters affect the life span, or total amount of time that the part is safe and useful.

Gauges and meters monitor various operating parameters, levels, and conditions. For example, there are a variety of gauges or meters that monitor oil levels, temperature levels, vehicle speed, engine speed or revolutions per minute (RPM), or loads of an engine or power plant. The Systems and parts typically have generally set or fixed life expectancies or predetermined effective usage life or time that are typically determined and calculated based on engineering or laboratory operational tests. This is called the life expectance, lifetime, or life span of the component or part.

Systems and parts, of course, operate under varying conditions based on both internal parameters and external parameters, which affect the life expectancies of the systems/parts. Examples of internal parameters that affect life expectancies of systems/parts include, but are not limited to, operating temperature, operating loads/weights, operating time, operating speed, travel distances, and operating pressure. Examples of external parameters that affect life expectancies of systems/parts include, but are not limited to, wind, temperature (both internal and external), particulate levels, contaminant levels, pressure (both internal and external), and moisture levels. The operating history of these parameters on the components or parts also affects life expectancies of the systems/parts.

Typically, systems or components need to be disassembled or torn apart in order to determine level of wear and tear on the subsystems or parts. Meters, gauges, or indicator displays for showing life used and/or remaining life of systems/parts generally do not exist; or if they exist are purely linear with time. Since internal parameters, external parameters, and/or operating history have to be taken into account for measuring life used and remaining life, meters, gauges, or indicator displays have to be very complicated or complex in order to be accurate. Many of the parameters, such as factors related to thermodynamic systems, fluid mechanic systems, thermo-mechanical systems, affect life expectancies and are difficult to determine, calculate, or estimate. Moreover it is extremely difficult to determine the inter-relationships between the various parameters. However, meters or gauges or displays, which quantify and provide current and more accurate estimates to an operator, monitoring person, or user when service to or replacement of the system/part may be necessary, would be extremely useful.

Therefore, there exists a need or demand for the development of a meter or gauge or indicator display or other such system or method for determining, estimating, and calculating accurate and current information related to life used and/or remaining life of a system/part. A further need exists to develop algorithms and implement expert system(s) for determining, estimating, and calculating such accurate and current information. The present invention discloses and provides a lifeometer apparatus and method for measuring and displaying life of systems/parts, and the present invention overcomes the problems, disadvantages, and limitations of the prior art.

SUMMARY OF INVENTION

Set forth is a brief summary of the invention in order to solve the foregoing problems and achieve the foregoing and other objects, benefits, and advantages in accordance with the purposes of the present invention as embodied and broadly described herein.

It is an object of the invention to provide a meter or gauge or indicator display for determining and displaying life of systems/parts.

It is another object of the invention to provide a lifeometer for determining and displaying estimated current information related to such life of the systems/parts.

It is a further object of the invention to provide a lifeometer that determines and displays life usage of the systems/parts.

It is a still further object of the invention to provide a lifeometer that determines and displays life remaining of the systems/parts.

It is another object of the invention to account for operating parameters in determining life of the systems/parts.

It is a further object of the invention to account for internal operating parameters including, but not limited to, operating temperature, operating loads/weights, operating time, operating speed or distances, and operating pressure in determining current life of the systems/parts.

It is a still further object of the invention to account for external operating parameters including, but not limited to, wind, external/outside temperatures, particulate levels, external pressures, and moisture levels in determining current life of the systems/parts.

It is another object of the invention to account for operating history in determining current life of the systems/parts.

It is still another object of the invention to provide a meter or gauge or display that would be extremely useful in quantifying and providing current and more accurate estimates to an operator, monitoring person, or user when service to or replacement of the system/part may be necessary.

It is a further object of the invention to provide algorithms and implement expert system(s) for determining, estimating, and calculating accurate and current information related to life of the systems/parts.

The objects and advantages are achieved by a general operation algorithm of a lifeometer. Optimal base reference life expectancy for the system/part being measured is provided. The lifeometer apparatus monitors and tracks/records internal operational parameters, environmental or external operational parameters or outside conditions at or near the system/part, and/or operating history of the system/part. The lifeometer determines whether remaining life is at a level where the system/part needs service or replacement. If the remaining life is not at such a level, the lifeometer continues to monitor and track/record various operational parameters and display remaining life and/or used life. If the remaining life is at such a level of service or replacement, then the lifeometer determines whether the system/part is to, in fact, be serviced or replaced. If the system/part is to be serviced or replaced, then the system/part is serviced or replaced, and the lifeometer resets remaining life level and/or used life level to appropriate values for the serviced or replaced system/part. The lifeometer then monitors and tracks/records various operational parameters and displays respective remaining life and/or used life. However, if the system/part is not to be serviced or replaced, then the lifeometer terminates monitoring operations.

The objects and advantages are further achieved by a lifeometer. The lifeometer is generally consisted of a system/part monitor, a computer system with a database, a display system, and an environmental/outside conditions monitor. The system/part monitor is coupled to or near each of the systems/parts. The system/part monitor monitors and takes measurements/readings related to internal operational parameters from each of the systems/parts. Furthermore, the environmental/outside conditions monitor obtains measurements or readings related to external operational parameters from the environment/outside conditions of the respective system/part. Optimal base reference life expectancy information and operating history are stored into a database of the computer system.

The objects and advantages are further achieved by performance and execution of various algorithms. The lifeometer uses the internal operational parameters, the external operational parameters, and/or the operating history information for determining present rate of usage for a system/part under a set of generally unchanged current conditions, and the lifeometer also tracks and records the amount of time operated under the set of generally unchanged current conditions. The lifeometer uses the rate of usage and amount of time operated to calculate present usage, and the lifeometer uses the present usage, the operating history, and the life expectancy information to determine and calculate used life and/or life remaining. The used life and/or life remaining is displayed on a display system of the lifeometer.

The objects and advantages are also achieved by various algorithms or mathematical formulas/models/equations that may be implemented for factoring the internal operating parameters, the external operating parameters, and the operating history to determine the current rate of usage of the systems/parts. Mathematical formulas and equations for weighting and factoring in the internal operating parameters, the external operating parameters, and the operating history for determining rate of usage of the system/part are used with the present invention.

The objects and advantages are further achieved by a digital display and/or an analog display and/or an indicator level display for the present invention lifeometer.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF DRAWING

FIG. 6 shows example mathematical formulas for the calculations for rate of usage under current conditions, for the weighted factor based on internal parameters, and for the weighted factor based on external parameters.

DETAILED DESCRIPTION

The present invention is a measuring and displaying apparatus 10 and corresponding method 5. For the present specification, lifeometer or lifeometer apparatus is generally defined as a device or apparatus that measures and displays life or remaining effective usage time/life or used life of various systems/parts. The lifeometer apparatus 10 of the present invention uses respective method 5 or other such methods to measure, calculate, determine, and display life times of systems/parts. The systems/parts that the lifeometer apparatus 10 measures and displays may be of any type where systems/parts wear out due to operating or physical parameters. Example systems or parts include, but are not limited to, thermodynamic systems, fluid mechanic systems, thermo-mechanical systems, or any other system/part that has a life expectancy. However, the present invention apparatus 10 is not limited to measuring and displaying life of these systems/parts only, and the present invention lifeometer 10 may be adapted to measure and display any other type of system/part.

Figure 1:
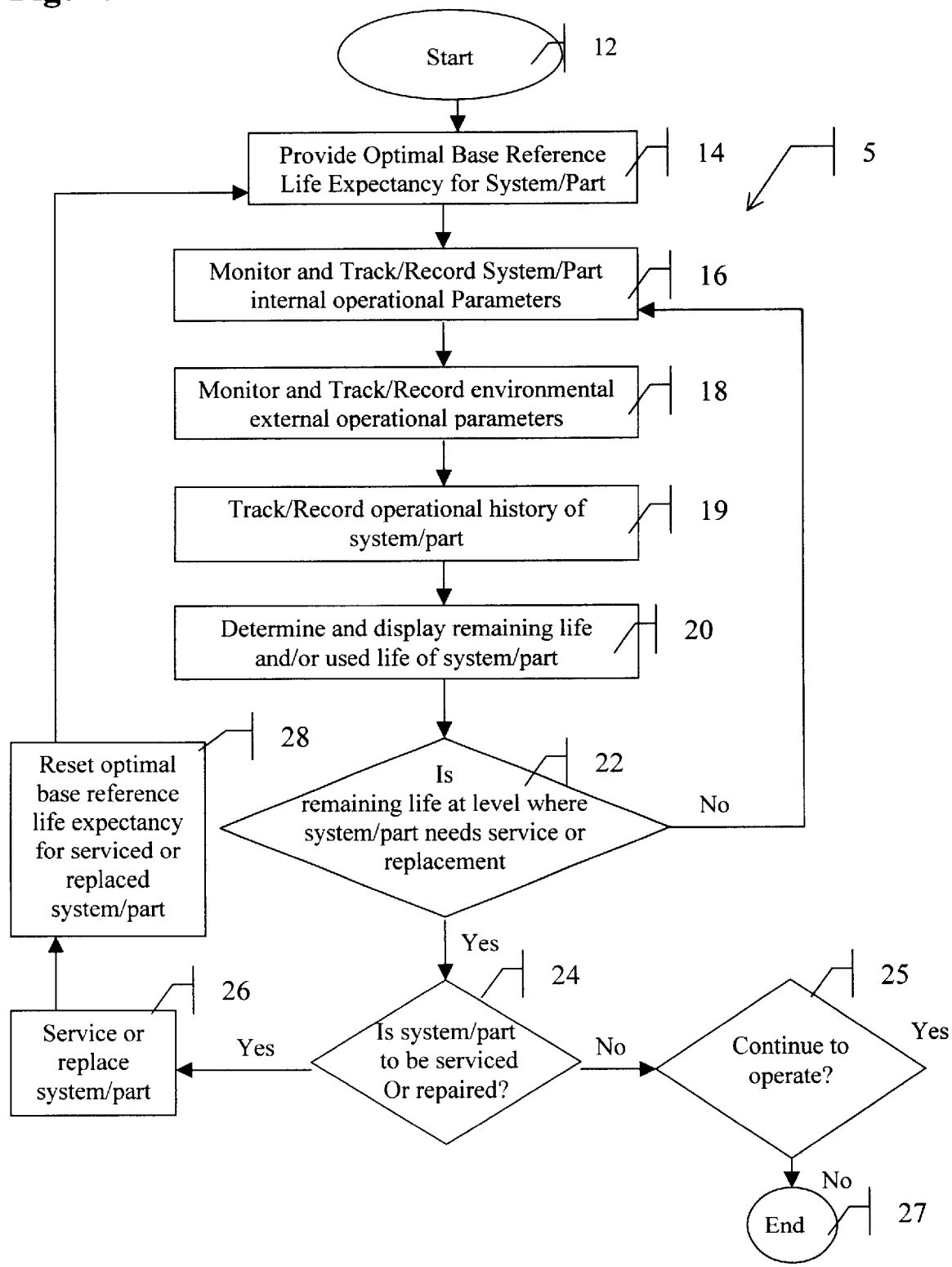
FIG. 1 is a general algorithm flow chart for operation of the present invention lifeometer.

FIG. 1 shows a flow chart algorithm/method 5 of the general operation of the lifeometer 10. The algorithm 5 starts at block 12. At block 14, the optimal base reference life expectancy for the system/part being measured is provided to the computer system 34 of the lifeometer apparatus 10 (see FIG. 2). The computer system 34 of the lifeometer apparatus 10 monitors internal operational parameters of the system/part, see block 16. Internal operational parameters may include, but are not limited to, operating temperature, operating loads/weights, operating time, operating speed or distances, and operating pressure. The computer system 34 tracks and records in its database the values of the various internal operational parameters and displays remaining life level and/or life usage level. At block 18, the computer system 34 of the lifeometer 10 monitors and tracks/records environmental or external operational parameters or outside conditions at or near the system/part. External operational parameters may include, but are not limited to, wind, external or outside temperatures, particulate levels, external or outside pressure levels, and moisture levels. The order in which the internal and external parameters are measured and recorded are not critic to the invention. Thus, the external parameters may be measured and recorded, block 18, either before, or simultaneous to, the measurement of the internal parameters, block 16. At block 19, operating history of the system/part is tracked by the computer 34 and is used to calculate the remaining life and/or used life of the system/part. The lifeometer 10 determines and displays remaining life and/or used life of the system/part at block 20. Furthermore, it is contemplated and within the scope of this invention for the internal and external parameter measuring devices to exist prior to attachment of the lifeometer 10 to the system/part or to be included as a part of the lifeometer 10 to be attached to the system/part.

At block 22, the computer system 34 of lifeometer 10 makes a comparison with the optimal life expectancy for the system/part as provided in block 14 and determines whether the remaining life is at a level where the system/part needs service or replacement. If the remaining life is not at such a level, the algorithm 5 loops back to where the computer system 34 continues to monitor and track/record various operational parameters at blocks 16 and 18 and continues to update and display remaining life and/or used life at block 20. When the remaining life is at such a level of service or replacement, then the algorithm 5 moves to block 24 to determine whether the system/part is to, in fact, be serviced or replaced. When the system/part is to be serviced or replaced, then the algorithm 5 moves to block 26 where the system/part is serviced or replaced, and the algorithm 5 then moves to block 28 where the computer system 34 resets remaining life level and/or used life level to appropriate values for the newly serviced or replaced system/part. The algorithm 5 then loops back to where the computer system 34 monitors and tracks/records various operational parameters at blocks 16 and 18 and displays respective remaining life and/or used life at block 20. However, if the system/part is not to be serviced or replaced, then the algorithm 5 ends at block 30.

Figure 2:
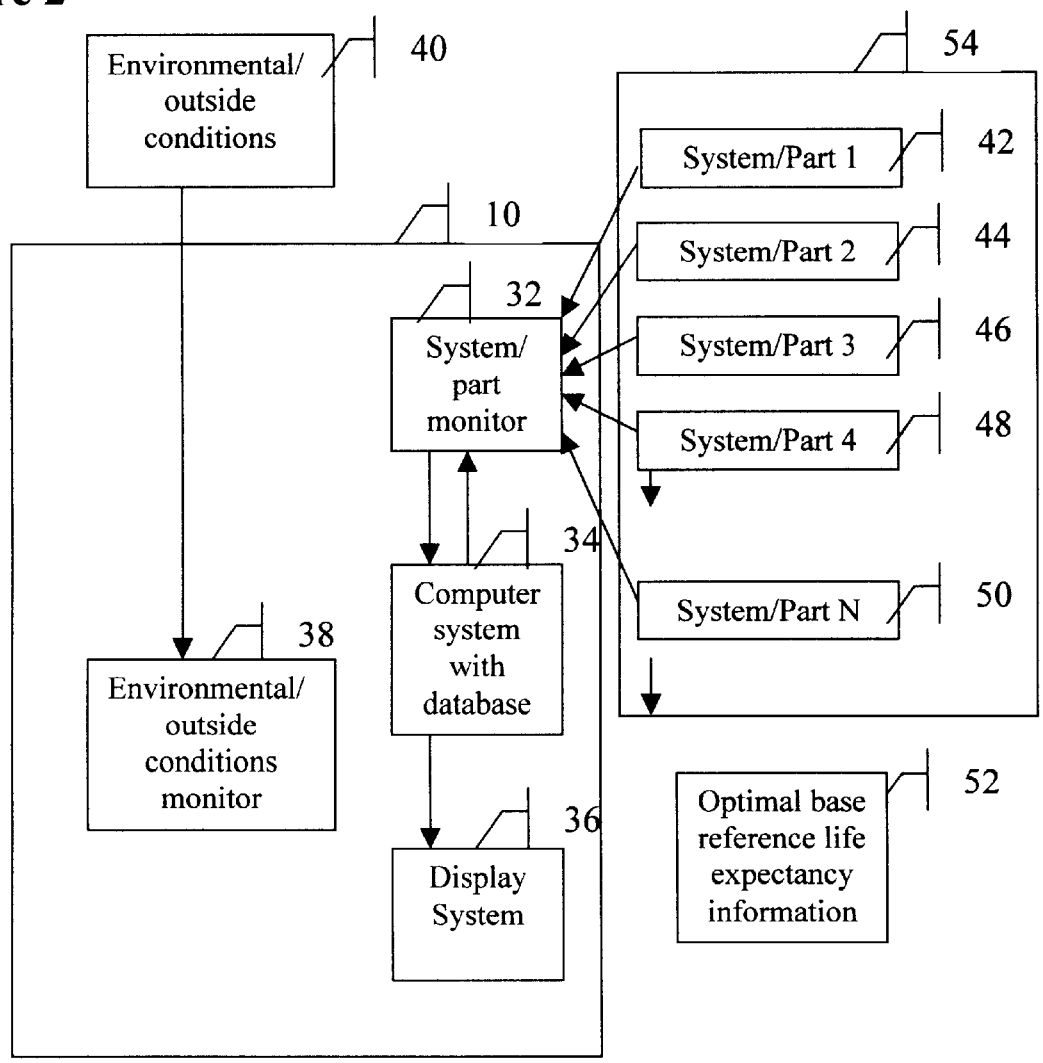
FIG. 2 is a block diagram of the present invention lifeometer coupled to various inputs.

FIG. 2 shows a block diagram of the present invention lifeometer 10. The lifeometer 10 has at least one system/part monitor 32, a digital processor 34 with a database, at least one display system 36, and at least one environmental/outside conditions monitor 38. The system/part monitor 32 is coupled to or near each of the systems/parts 42, 44, 46, 48, and 50, which are respectively systems/parts 1, 2, 3, 4, and N. The system/part monitor 32 may be a single monitor or a plurality of monitors. The system/part monitor 32 monitors and takes measurements/readings related to internal operational parameters from each of the systems/parts 1 to N. The information related to internal operational parameters is communicated or transmitted to the digital processor 34. Transmission may be either from direct connection, such as an electrically conductive wire, or it may be an indirect, or wireless, communication, such as by radio frequency waves, infrared signals, optical transmission, or the like. Furthermore, the environmental/outside conditions monitor 38 obtains measurements or readings related to external operational parameters from the environment/outside conditions 40 of the respective system/part. The information that relates to external operational parameters are also communicated to the digital processor 34. Optimal base reference life expectancy information is stored in the database of the digital processor34. Operating history information of the systems/parts are also stored in the database of the computer 34.

A computing system, according to the present invention, will include a computing device, preferably a digital processor 34 performs and executes various algorithms. It should be recognized that analog computing devices fall within the scope of the present invention, when they are capable of the required calculations. The digital processor 34 uses the internal operational parameters, the external operational parameters, and/or the operating history information for determining present rate of usage for a system/part under a set of generally unchanged current conditions, and the digital processor 34 also tracks and records the amount of time operated under the set of generally unchanged current conditions. The digital processor 34 uses the rate of usage and amount of time operated to calculate present usage, and the digital processor 34 uses the present usage, the operating history, and the life expectancy information to determine and calculate used life and/or life remaining. The used life and/or life remaining is displayed on the display system 36. The compilation of all of the systems/parts 1 to N may comprise a comprehensive system 54. The information gathered for each of the systems/parts 1 to N may be further used to calculate rate of usage, used life, and/or life remaining for the comprehensive system 54.

The present invention is not in any way limited to a particular configuration such as the configuration shown in FIG. 2. Numerous configurations exist for the present invention. For example, the system/part monitor 32 may be a plurality of monitors that monitor the plurality of systems or a plurality of parts or a plurality of both the systems and parts. Alternatively, a plurality of lifeometers 10 may be used instead of a plurality of system/part monitors to monitor each of the systems and/or each of the parts wherein each of the systems and/or parts would be monitored by its own lifeometer 10. Any combination of lifeometers 10 and/or system/part monitors 32 may be used to respectively monitor various systems, sub-systems, parts, components, etc.

Figure 3:
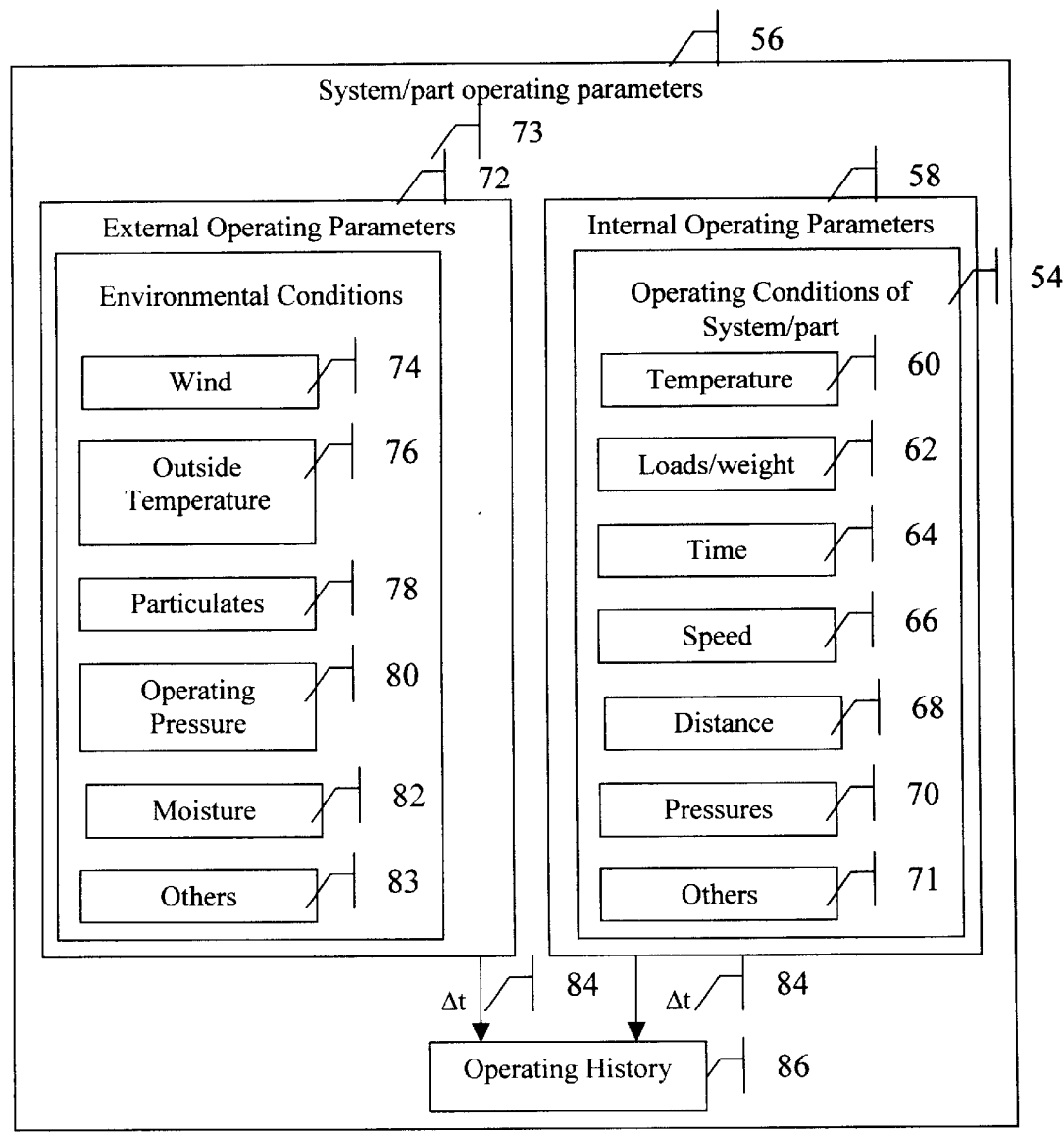
FIG. 3 is a block diagram of system/part operating parameters.

FIG. 3 shows a block diagram of the system/part operating parameters. The general block 56 encompasses the general system/part operating parameters. A block 58 for internal operating parameters, a block 72 for external operating parameters, and a block 86 for operating history are all contained within the general block 56. The block 58 for internal operating parameters contains an operating conditions block 54 for the system/part. Operating conditions block 54 contains an operating temperature block 60, an operating load/weight block 62, an operating time block 64, a speed block 66, a distance block 68, and an operating pressure block 70. A block 72 for external operating parameters contains an environmental/outside conditions block 73. The environmental/outside conditions block 73 contains a wind block 74, an outside temperature block 76, a particulate block 78, an operating pressure block 80, and a moisture block 82. As time changes a $\Delta t$ amount 84, the computer system 34 stores the information from the internal operating parameters of block 58 and the external operating parameters of block 72 into the operating history block 86 for the various operating times or time intervals.

Figure 4:
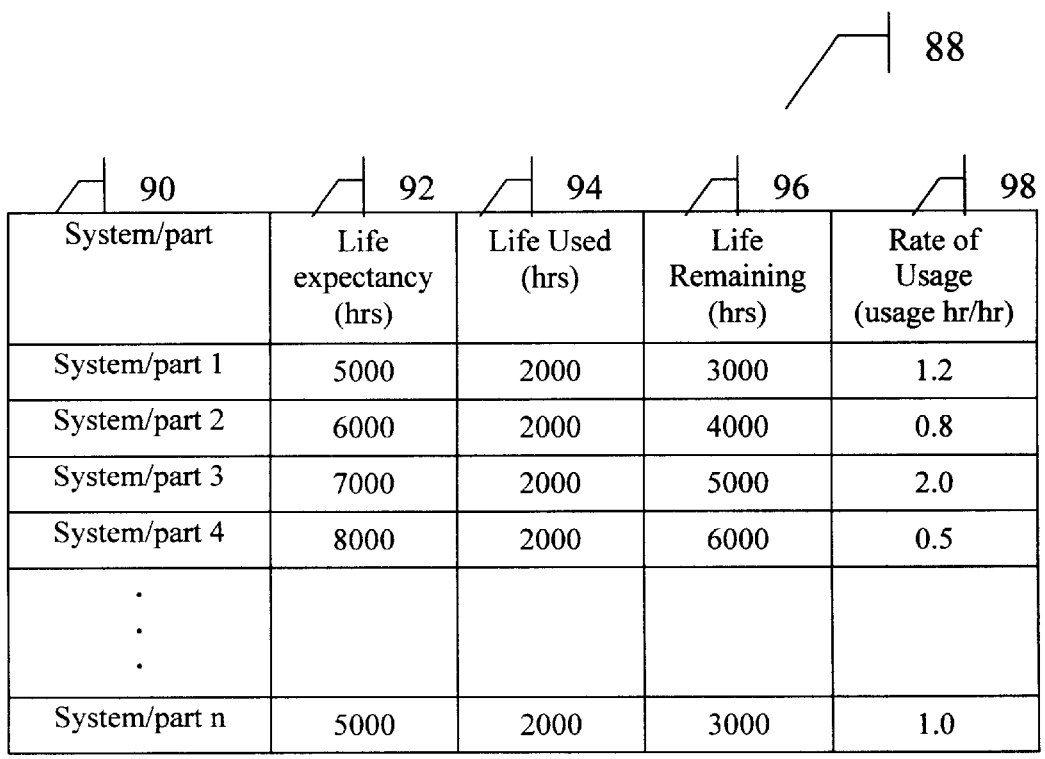
FIG. 4 is a first embodiment meter/display or digital display for the present invention lifeometer.

The Figures show various embodiments of meters/displays for the lifeometer 10. Referring to FIG. 4, the meters/displays show rate of usage, present used life, or life remaining. The scales of the meters/displays are variable for various parts, or they may be normalized between bounds. A first embodiment meter/display 88 is a digital display. The meter/display 88 has a digital readout column 90 for identifying the various systems/parts 1 to N or the comprehensive system, a digital readout column 92 that shows the respective life expectancies (hours) for the respective systems/parts, a digital readout column 94 that shows the respective life used (hours) for the respective systems/parts, a digital readout column 96 that shows the respective life remaining (hours) for the systems/parts, and a digital readout column 98 that shows the respective rates of usage (usage hours per hour) for the systems/parts.

Figure 5:
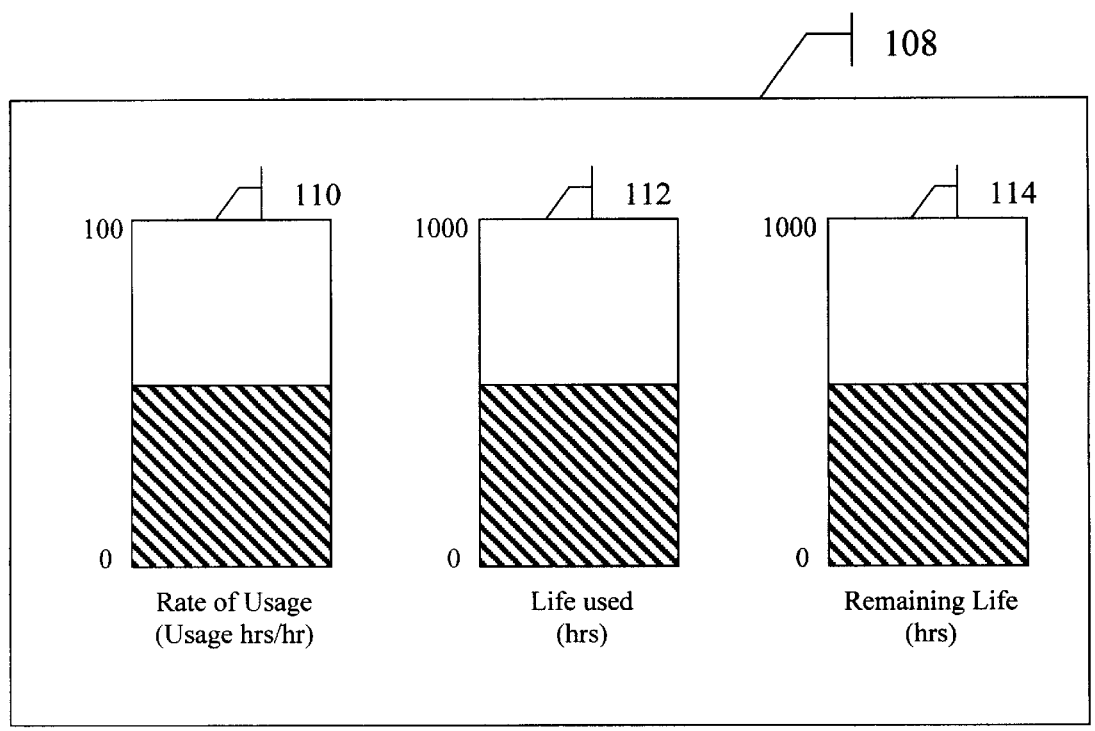
FIG. 5 is a second embodiment meter/display or analog display for the present invention lifeometer.

A second embodiment meter/display is an analog display. The meter/display has an analog readout meter for indicating rate of usage (usage hours per hour), an analog readout meter for indicating life used (hours), and an analog readout meter for indicating remaining life (hours). Also, there is a third embodiment meter/display 108, which is an indicator level display. Referring to FIG. 5, the meter/display 108 has various indicator level bars. One indicator level bar 110 shows rate of usage (usage hours per hour). Another indicator level bar 112 shows life used (hours) while a further indicator level bar 114 shows remaining life (hours).

Various algorithms or mathematical formulas/models/equations may be implemented for factoring the internal operating parameters, the external operating parameters, and the operating history to determine the current rate of usage of the systems/parts. FIG. 6 shows example mathematical formulas and equations for weighting and factoring in the internal operating parameters, the external operating parameters, and the operating history for determining rate of usage of the system/part. Formula 116 and equations 118, 120, and 121 show a weighting method for providing rate of usage of the system/part. Equation 118 shows an example for determining the weighted factor for internal operating parameters ($W_{Ip}$). Weighted factor $W_{Ip}$ is determined by the product of the weighted factors for various internal operating parameters such as operating temperature ($W_{Temp}$), operating loads/weights ($W_L$), operating time ($W_{Time}$), speed ($W_S$), and/or distance ($W_D$). The various internal operating parameters that affect life of the system/part are factored into the weighted factor $W_{IP}$ and accounted to determine rate of usage while those internal parameters that do not affect life of the system/part are not factored into weighted factor $W_{IP}$ and not accounted to determine rate of usage. Other operating conditions, include but are not limited to, power consumption, fuel flow rate, airflow or liquid flow rate, internal pressure, force acting on the part, displacement, and the like.

Equation 120 shows an example for determining the weighted factor for external operating parameters ($W_{EP}$). In this example, the weighted factor $W_{EP}$ is shown to depend on the weighted factors for various external operating parameters such as wind ($W_{wind}$), external temperature ($W_{ExtTemp}$), particulates ($W_{particulates}$), pressure ($W_{pressure}$), and/or moisture ($W_{moisture}$). The various external operating parameters that affect life of the system/part are factored into the weighted factor $W_{EP}$ and accounted to determine rate of usage while those external parameters that do not affect life of the system/part are not factored into weighted factor $W_{EP}$ and not accounted to determine rate of usage. Other operating conditions, include but are not limited to, loading, power extraction, airflow bleed off, and the like.

Furthermore, weighted factor for operating history ($W_{OH}$) is factored or accounted when applicable to determine rate of usage. Equation 116 determines the rate of usage based on the respective and applicable weighted factors $W_{IP}$, $W_{EP}$, and $W_{OH}$ by combining the effects of these weighted factors together. In this example, and with a predetermined normal rate of usage (NRU) of the system/part is used as the measure of reference for the rate of usage.

The present invention utilizes a mathematical formula for factoring in the various effects such as internal operating parameters, external operating parameters, operating history, and others on the rate of usage (RU). An example is presented using weighting methods to account for these effects. Many other methods and algorithms may be implemented to factor such parameters into the rate of usage calculation. For example, expert systems and artificial intelligence (AI) algorithms are well known in the art, and the use of such algorithms and systems may be easily implemented and/or adapted to account for such parameters and factors into a rate of usage calculation or implemented and/or adapted to other algorithms, calculations, and operations of the present invention.

The preferred embodiment of the invention is described above in the Figures and Detailed Description. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application and to enable others skilled in the art to best utilize the invention in various embodiments and with various modifications as are suited to the particular use contemplated.

What is claimed is:

1. A method for determine the useful life remaining for at least one component of a system comprising:

a) connecting at least one computing device to at least one component of a system;

b) entering an optimal lifespan for each of the at least one component of the system into the computing device;

c) measuring at least one internal parameter of the system with the computing device;

d) communicating the measured value for the at least one internal parameter;

e) recording the at least one internal parameter and a time history measurement;

f) calculating a life used value, according to a predetermined algorithm using weighted factors in the calculation, using the recorded measured value of the at least one internal parameter and the recorded time history measurements using the computing device;

g) comparing the calculated life of the component to the optimal span provided and recorded and determining, using a predetermined algorithm, a value for whether the component needs to be serviced or replaced, according to a predetermine service or replacement schedule, using the computing device;

h) displaying a value for at least one of the values selected from the group comprising optimal lifespan, life used, life remaining or rate of usage;

i) if the computing device does not provide a value requiring the servicing or replacement of the component, then returning to step c of the method;

j) if the computing device provides a value requiring the service or replacement of the component, then servicing or replacing the component, according to a predetermine service or replacement work scope;

k) if the component is serviced or replaced, restarting the process from step b above; and l) further including the step of measuring at least one external parameter of the system with the computing device, said step of measuring at least one external parameter of the system accomplished either previous to, simultaneously, or subsequent to, the said step of measuring the at least one internal parameter of the system and the step of communicating the measured value for the at least one external parameter, said step of communicating the measured value of the at least one external parameter of the system accomplished either previous to, simultaneously, or subsequent to, the said step of communicating the measured value of the at least one internal parameter of the system and recording the at least one external parameter with a time history measurement into the computing device, said step of recording the measured value of the at least one external parameter of the system accomplished either previous to, simultaneously, or subsequent to, the said step of recording the measured value of the at least one internal parameter of the system and further calculating the life used value, according to the predetermined algorithm, including the recorded measured value of the at least one external parameter using the computing device, where the weighting factor for the external parameters is calculated using the equation: $W_{EP} = W_{Wind} * W_{Ext.Temp} * W_{Particulates} * W_{Pressure} * W_{Moisturer}$, wherein $W_{EP}$ is a weighted factor for external operating parameters, $W_{Wind}$ relates to wind velocity, $W_{Ext.Temp}$ relates to external temperature, $W_{Particulates}$ relates to external particulates, $W_{Pressure}$ relates to external pressure, and $W_{Moisture}$ relates to external moisture, and the weighting factor for the internal parameters is calculated using the equation: $W_{IP} = W_{Temp} * W_L * W_S * W_D$, wherein $W_{IP}$ is an internal weighted factor for internal operating parameters, $W_{Temp}$ relates to internal operating temperature, $W_L$ relates to operating load, $W_S$ relates to operating speed, $W_D$ relates to the operating distance and wherein said computing device further comprises a processor in communication with the component, at least one display system in communication with the at least one digital processor, and at least one manual data input system in communication with the at least one digital processor.

2. The method according to claim 1 wherein the step of communicating the measured values is communicating by direct communication.

3. The method according to claim 1 wherein the step of communicating the measured values is communicating by indirect communication.

4. A device for determining the useful life remaining for components of a system comprising:

a) at least one computing device that is connectable to at least one component of a system, said measuring, recording, and computational device further comprising, i) at least one digital processor, ii) at least one display system in communication with the at least one digital processor, said display system for displaying information to a user, iii) at least one manual data input system in communication with the at least one digital processor, said manual data input system for entering data into the computer system, iv) at least one internal parameter measuring device in communication with the at least one digital processor, said at least one internal parameter measuring device for measuring internal operating parameters of the system, b) said computer system further being capable of i) connecting the device to at least one component of the system;

ii) entering an optimal lifespan for each of the at least one component of the system into the device;

iii) measuring at least one internal parameter of the system with the device;

iv) communicating the measured value for the at least one internal parameter;

v) recording the at least one internal parameter with a time history measurement into the device;

vi) calculating a life used value, according to a predetermined algorithm using weighted factors in the calculation, using the recorded measured value of the at least one internal parameter and the recorded time history measurements using the device;

Vii) displaying a value for at least one of the values selected from the group comprising optimal lifespan, life used, life remaining or rate of usage;

viii) comparing the calculated life of the component to the optimal span provided and recorded and determining, using a predetermined algorithm, a value for whether the component needs to be serviced or replace, according to a predetermine service or replacement work scope, using the device;

ix) if the device does not provide a value requiring the servicing or replacement of the component, then returning to step b) iii) above;

x) if the device provides a value requiring the service of replacement of the component, then servicing or replacing the component, according to a predetermine service or replacement work scope;

xi) if the component is serviced or replaced then restarting the process from step b) ii) above; and xii) wherein the computing device further has at least one external parameter measuring device in communication with the at least one digital processor, said at least one internal parameter measuring device for measuring internal operating parameters of the system and said computing device is further capable of measuring at least one external parameter of the system with the device, said step of measuring at least one external parameter of the system accomplished either previous to, simultaneously, or subsequent to, the said step of measuring the at least one internal parameter of the system and communicating the measured value for the at least one external parameter, said step of communicating the measured value of the at least one external parameter of the system accomplished either previous to, simultaneously, or subsequent to, the said step of communicating the measured value of the at least one internal parameter of the system and recording the at least one external parameter, said step of recording the measured value of the at least one external parameter of the system accomplished either previous to, simultaneously, or subsequent to, the said step of recording the measured value of the at least one internal parameter of the system and further calculating the life used value, according to the predetermined algorithm, including the recorded measured value of the at least one external parameter using the device, wherein the weighting factor for the external parameters is calculated using the equation: $W_{EP} = W_{Wind} * W_{Ext.Temp} * W_{Particulates} * W_{Pressure} * W_{Moisture}$, wherein $W_{EP}$ is a weighted factor for external operating parameters, $W_{Wind}$ relates to wind velocity, $W_{Ext.Temp}$ relates to external temperature, $W_{Particulates}$ relates to external particulates, $W_{Pressure}$ relates to external pressure, and $W_{Moisture}$ relates to external moisture, and the weighting factor for the internal parameters is calculated using the equation: $W_{IP} = W_{Temp} * W_L * W_S * W_D$, wherein $W_{Ip}$ is an internal weighted factor for internal operating parameters, $W_{Temp}$ relates to internal operating temperature, $W_L$ relates to operating load, $W_S$ relates to operating speed, $W_D$ relates to the operating distance, and c) said computing device further being sufficient to calculate values of algorithms using as parameters to the algorithms at least some of the data received from the at least one internal parameter measuring device.

5. The device according to claim 4 wherein the measured values are transmitted by direct communication.

6. The device according to claim 4 wherein the measured values is transmitted by indirect communication.

* * * * *